(12) United States Patent
Harrison et al.

(10) Patent No.: US 7,837,928 B2
(45) Date of Patent: Nov. 23, 2010

(54) APPARATUS AND METHOD FOR INJECTION OF FLUID HYDROCARBONS INTO A BLAST FURNACE

(75) Inventors: Frank W. Harrison, Burlington (CA); Lawrence A. Drebert, Cayuga (CA)

(73) Assignee: U.S. Steel Canada Inc., Hamilton, Ontario (CA)

(*) Notice: Subject to any disclaimer, the term of this patent is extended or adjusted under 35 U.S.C. 154(b) by 197 days.

(21) Appl. No.: 12/015,184

(22) Filed: Jan. 16, 2008

(65) Prior Publication Data

US 2008/0211148 A1    Sep. 4, 2008

Related U.S. Application Data

(60) Provisional application No. 60/880,370, filed on Jan. 16, 2007.

(51) Int. Cl.
  *C21B 7/16* (2006.01)
(52) U.S. Cl. .................................... 266/267; 266/265
(58) Field of Classification Search ............... 266/265, 266/266, 267, 270, 168, 171, 186
See application file for complete search history.

(56) References Cited

U.S. PATENT DOCUMENTS

| | | | |
|---|---|---|---|
| 3,209,810 A | 10/1965 | Schuvart | |
| 3,558,119 A | 1/1971 | Demalander | |
| 3,602,487 A | 8/1971 | Johnson | |
| 3,809,524 A | 5/1974 | Bruhlet et al. | |
| 3,811,869 A | 5/1974 | Ponghis et al. | |
| 3,832,121 A | 8/1974 | Metz et al. | |
| 3,833,356 A * | 9/1974 | Luth | 75/462 |
| 3,856,509 A * | 12/1974 | Heynert et al. | 75/462 |
| 3,937,449 A * | 2/1976 | Copeland et al. | 266/188 |
| 4,022,573 A | 5/1977 | Kuntziger | |
| 4,127,259 A | 11/1978 | Luth | |
| 4,138,098 A | 2/1979 | Leroy | |
| 4,145,033 A | 3/1979 | Kuntziger | |
| 4,153,426 A | 5/1979 | Wintrell | |

(Continued)

FOREIGN PATENT DOCUMENTS

EP    1051524    10/2001

(Continued)

OTHER PUBLICATIONS

Abstract and English Machine Translation of JP 2003-231905 (Aug. 19, 2003).*

(Continued)

*Primary Examiner*—Scott Kastler

(57) ABSTRACT

A tuyere assembly for directing air and one or more fluid hydrocarbons into a cavity in a blast furnace. The tuyere assembly includes a blowpipe portion with a conduit defining a bore through which the air is directed. The tuyere assembly also includes a tuyere with a chamber defined by one or more walls thereof, the chamber being in fluid communication with the cavity of the blast furnace, and the chamber of the tuyere and the bore of the blowpipe portion form an internal cavity of the tuyere assembly. Also, the tuyere assembly includes one or more injector subassemblies having one or more outlet ends, each outlet end being adapted for directing the hydrocarbon into the internal cavity for combustion thereof to provide a flame substantially having a preselected flame configuration.

13 Claims, 15 Drawing Sheets

U.S. PATENT DOCUMENTS

| | | | |
|---|---|---|---|
| 4,333,761 | A | 6/1982 | Ahrendt et al. |
| 4,455,165 | A | 6/1984 | Santen et al. |
| 4,536,194 | A | 8/1985 | Boggs et al. |
| 4,662,937 | A | 5/1987 | Katayama et al. |
| 4,759,532 | A * | 7/1988 | Illuminati .................. 266/182 |
| 6,383,445 | B1 * | 5/2002 | Anderson et al. ........... 266/225 |
| 6,464,928 | B1 | 10/2002 | Lipukin et al. |
| 6,523,348 | B1 | 2/2003 | Acharya et al. |

FOREIGN PATENT DOCUMENTS

| | | | |
|---|---|---|---|
| EP | 0845644 | | 3/2004 |
| GB | 402254 | | 11/1933 |
| GB | 1271688 | | 4/1972 |
| GB | 1283790 | | 8/1972 |
| GB | 1342450 | | 1/1974 |
| GB | 1360988 | | 7/1974 |
| GB | 1384755 | | 2/1975 |
| GB | 1436266 | | 5/1976 |
| GB | 1454303 | | 11/1976 |
| GB | 1457793 | | 12/1976 |
| GB | 1534788 | | 12/1978 |
| GB | 2049820 | | 5/1979 |
| GB | 2062686 | | 5/1981 |
| GB | 1599356 | | 9/1981 |
| GB | 2116957 | | 10/1983 |
| JP | 05179323 | | 7/1993 |
| JP | 06088108 | | 3/1994 |
| JP | 2003-231905 | * | 8/2003 |
| JP | 2003-231905 A | * | 8/2003 |

OTHER PUBLICATIONS

Cardozo et al., Analysis of Natural Gas injection through Blast furnace Tuyeres, 5th IAS Ironmaking Conference (2005), San Nicholas, Argentina, Dec. 2005.

Vetoniemi et al., High Oil Injection Rate and High Productivity at Raahe Blast Furnaces of Ruukki Production, Ruukki Procuction, Raahe Steelworks, Finland.

Chui et al., Modeling the Co-Injection of Coal and Natural Gas in a High Speed Environment (2003), Seventh International Conference on Technologies and Combustion for a Clean Environment, Lisbon, Dec. 2003.

* cited by examiner

APPARATUS AND METHOD FOR INJECTION OF FLUID HYDROCARBONS INTO A BLAST FURNACE

This application claims the benefit of U.S. Provisional Application No. 60/880,370, filed on Jan. 16, 2007.

FIELD OF THE INVENTION

This invention is related to a tuyere assembly for directing air and fluid hydrocarbons into a cavity in a blast furnace.

BACKGROUND OF THE INVENTION

Natural gas injection into a blast furnace typically occurs through a pipe or tube fitted through the side wall of the blowpipe or tuyere. Under ideal conditions, natural gas reacts with oxygen contained in the hot blast through the blowpipe or tuyere according to reaction (1) to produce combustion products and release energy.

$$CH_4 + 2O_2 \rightarrow CO_2 + 2H_2O \tag{1}$$

Once these gases reach the hot coke bed at the edge of the raceway they are converted into the CO and $H_2$ that reduce the iron ore.

However, several factors make blast furnace injection conditions less than ideal. The gas floods into the tuyere and raceway with limited opportunity for mixing with the hot blast. The poor mixing is compounded by the high gas velocities through this area—in excess of 200 m/s—so residence times are only a few milliseconds. As a result, only partial combustion of the natural gas takes place. Once the gases leave the raceway they enter the coke bed where any remaining oxygen reacts immediately with the hot coke. Once this occurs further combustion of the natural gas is not possible.

As a result of these factors, significant fractions of the natural gas do not react with oxygen but instead decompose thermally according to reaction (2):

$$CH_4 \rightarrow C + 2H_2 \tag{2}$$

Although the hydrogen thus produced is used beneficially in the blast furnace for smelting iron ore, the carbon soot is relatively unreactive. As a result much of this carbon passes through the blast furnace and is lost to the dust and sludge collected in the gas cleaning system. In addition the added load of fine particles (i.e., carbon soot) is detrimental to furnace operation. Improved utilization of this carbon is a significant opportunity for reduced blast furnace operating cost and improved operational performance.

Previous approaches in the prior art to improving the efficiency of natural gas use include the following.

Curved Injection Pipe—An injection pipe is used which is curved such that its discharge is opposite to the flow of the hot blast through the blowpipe and tuyere. The idea is that introducing the natural gas in a direction of flow contrary to the direction of the hot blast through the blowpipe would increase mixing and residence time. The curved lance approach creates operational difficulties in that the lance cannot be changed without removing the entire tuyere.

Mixing Station—A mixing station is used to introduce limited quantities of oxygen into the natural gas to reduce the time required for oxygen and natural gas to mix in the tuyere and raceway.

The mixing station approach requires installation of capital equipment to achieve the mixing, and important control equipment to ensure that explosive oxygen/NG mixtures are not created. A source of oxygen is required to support this approach. Also, the admixed oxygen is injected cold and adds an undesirable thermal load to the furnace.

There is therefore a need for an apparatus and a method for injection of natural gas and/or other fluid hydrocarbons into a blast furnace which overcomes or mitigates one or more of the disadvantages of the prior art.

SUMMARY OF THE INVENTION

In its broad aspect, the invention provides a tuyere assembly for directing air and one or more fluid hydrocarbons into a cavity in a blast furnace. The tuyere assembly includes a blowpipe portion with an inward end thereof and a conduit defining a bore, the blowpipe portion being adapted for directing the air through the bore to the inward end. In addition, the tuyere assembly includes a tuyere with an upstream opening adjacent to the inward end and a downstream opening, the upstream and downstream openings being connected by a chamber defined by one or more walls thereof, and the downstream aperture being in fluid communication with the cavity of the blast furnace. The chamber of the tuyere and the bore of the blowpipe portion form an internal cavity of the tuyere assembly. The tuyere assembly also includes one or more injector subassemblies with one or more outlet ends. Each outlet end has a nozzle (or opening) for directing the hydrocarbon into the internal cavity for combustion of the hydrocarbon to provide a flame substantially having a preselected flame configuration. The injector subassembly includes one or more channels in fluid communication with the outlet end for directing the hydrocarbon to the outlet end, so that the fluid hydrocarbon exits the injector subassembly at the outlet end to provide the flame.

In another aspect, the outlet end is disposed in the internal cavity so that direct contact of the flame with the wall(s) of the chamber is substantially minimized.

In yet another aspect, the nozzle includes a number of apertures positioned to direct the hydrocarbon into the internal cavity to provide the flame.

In another of its aspects, the injector subassembly additionally includes an internal tube defining an internal tube bore therein and an annulus therearound, the internal bore being in fluid communication with an axial aperture in the nozzle. The injector subassembly is adapted for directing a first fluid hydrocarbon through the annulus and a second fluid hydrocarbon through the tube to exit at the nozzle so that the first and second hydrocarbons are mixed together as they are directed into the internal cavity to provide the flame.

In another of its aspects, the injector subassembly includes a number of injector units. Each injector unit includes one or more outlet ends, and each said injector unit is at least partially disposed in the conduit.

In yet another aspect, the outlet ends are substantially equally radially spaced apart from each other. Each outlet end is positioned to direct the hydrocarbon into the internal cavity so that direct contact of the flame with the wall(s) of the chamber is substantially minimized.

In another of its aspects, the tuyere assembly additionally includes a second injector subassembly having a second outlet end positioned in the internal cavity. The second outlet end includes a nozzle for directing the hydrocarbon into the internal cavity to provide a second flame having a preselected flame configuration so that direct contact of the flame with the wall of the chamber is substantially minimized.

BRIEF DESCRIPTION OF THE DRAWINGS

The invention will be better understood with reference to the attached drawings, in which.

DETAILED DESCRIPTION

Figure 1:
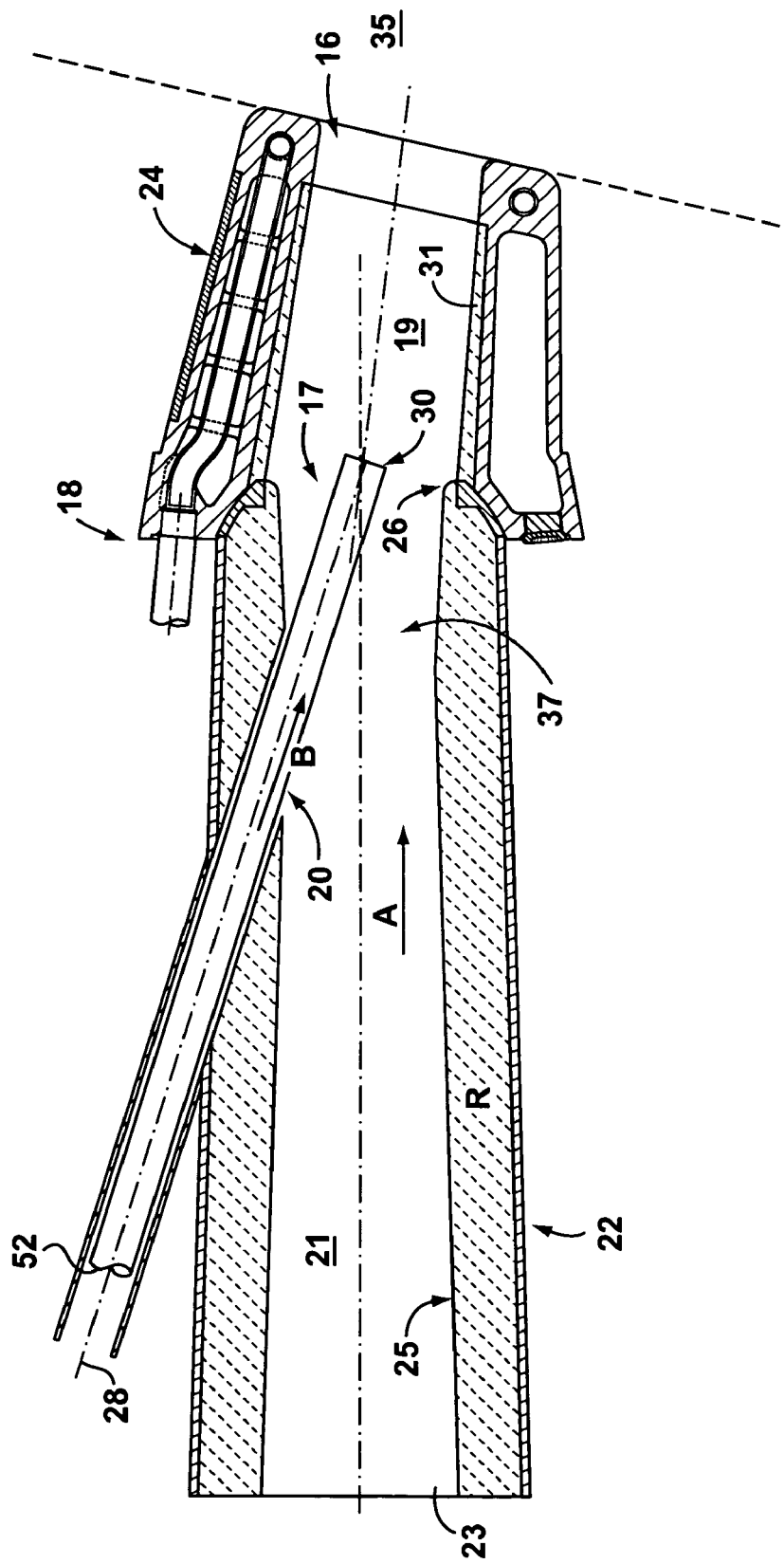
FIG. 1 is a cross-section of an embodiment of a tuyere assembly of the invention showing an embodiment of an injector lance of the invention mounted in an embodiment of a blowpipe of the invention.
Figure 2A:
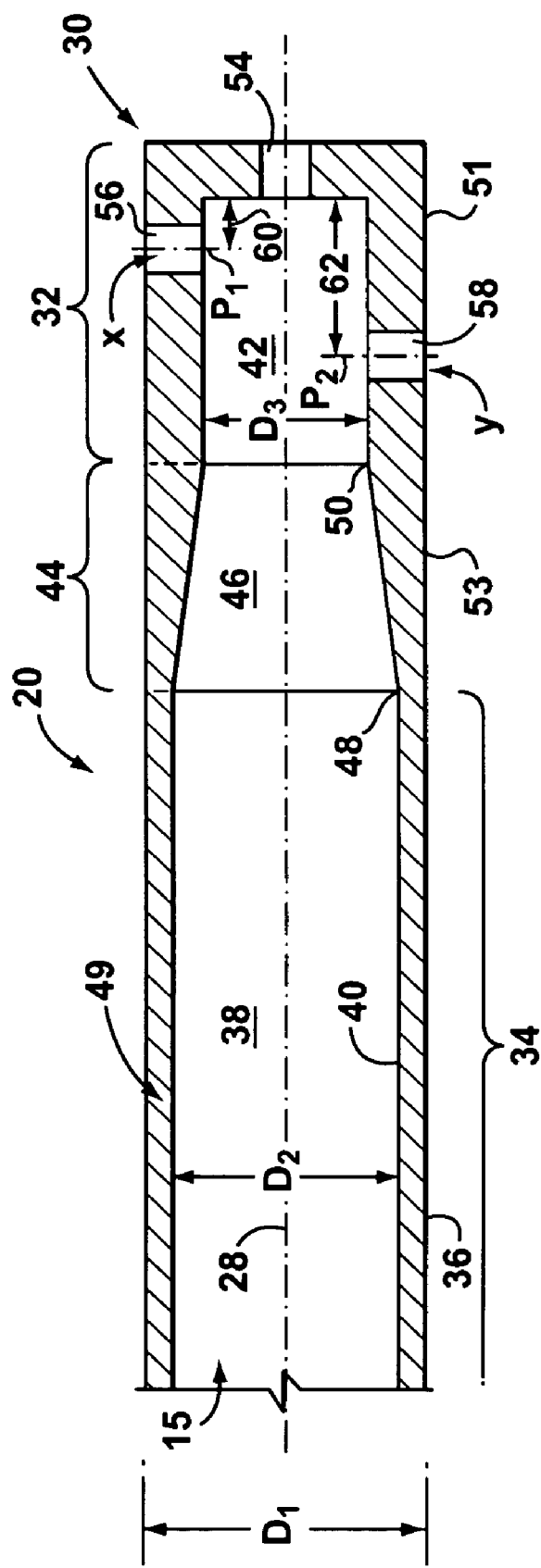
FIG. 2A is a cross-section of the injector lance of FIG. 1, drawn at a larger scale.
Figure 8:
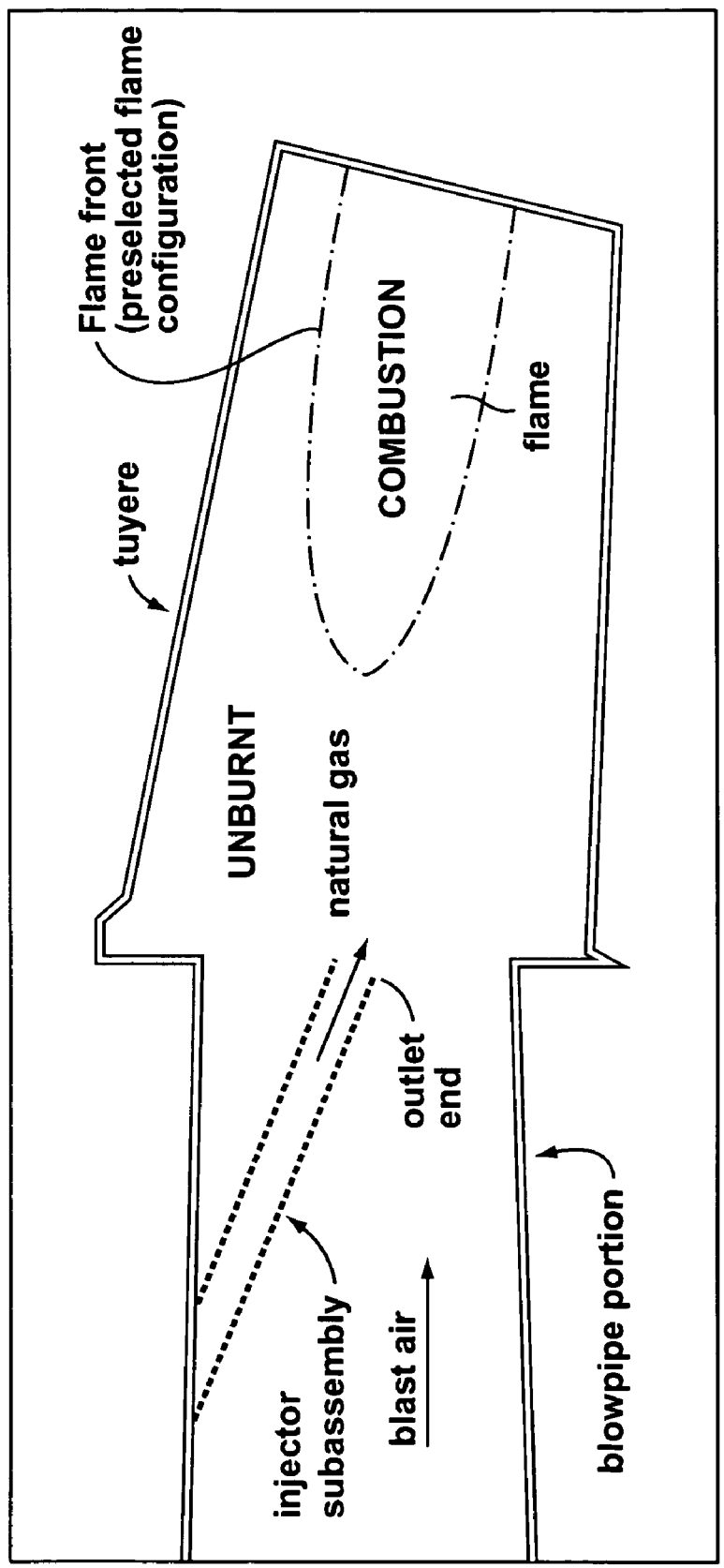
FIG. 8 is a cross-section schematically illustrating operation of the tuyere assemblies of FIGS. 2A, 2B, 3A and 3B in general, drawn at a smaller scale.

Reference is first made to FIGS. 1 and 2A to describe an embodiment of a tuyere assembly in accordance with the invention indicated generally by the numeral 18. The tuyere assembly 18 is for directing air and for directing one or more fluid hydrocarbons into a cavity 35 in a blast furnace (not shown). The tuyere assembly 18 preferably includes a blowpipe portion 22 with an inward end 26 thereof and a conduit 25 defining a bore 21. The blowpipe portion 22 is adapted for directing the air through the bore 21 to the inward end 26. As can be seen in FIG. 1, the tuyere assembly 18 also includes a tuyere 24 with an upstream opening 17 adjacent to the inward end 26 and a downstream opening 16 connected by a chamber 19. The chamber 19 is at least partially defined by one or more walls 31. The chamber 19 and the bore 21 collectively form an internal cavity 37 of the tuyere assembly 18 (FIG. 1). In addition, it is preferred that the tuyere assembly 18 includes one or more injector assemblies 20. It is also preferred that the injector assembly 20 includes one or more outlet ends 30 thereof. Each outlet end 30 preferably includes a nozzle 32 for directing fluid hydrocarbon(s) into the internal cavity 37 for combustion of the hydrocarbon(s) to provide a flame having a preselected flame configuration defined by a flame front, as schematically illustrated in FIG. 8, and as will be described. Preferably, the injector subassembly 20 includes one or more channels 15 in fluid communication with the outlet end 30 for directing the fluid hydrocarbon(s) to the outlet end 30 so that the hydrocarbon(s) exit the injector subassembly 20 to form the predetermined pattern (FIG. 2A).

In one embodiment, the channel 15 preferably is at least partially defined by a lance wall 49 (FIG. 2A).

It is preferred that the fluid hydrocarbon directed through the injector subassembly 20 is natural gas, or at least includes natural gas. However, other types of fluid hydrocarbons may be directed through the injector subassembly, instead of, or in addition to, natural gas.

In ordinary operating conditions, air (not shown) is directed through the blowpipe portion 22, from an upstream end thereof (indicated generally at 23 in FIG. 1) in a downstream direction (i.e., in the direction of arrow "A" in FIG. 1), generally towards the inward end. It will be understood by those skilled in the art that the direction of air flow in the blowpipe portion 22 is, in part, not parallel to an axis 27 of the conduit 25 in the downstream portion of the bore 21 because a portion of the injector subassembly 20 extending into the bore 21 disrupts the air flow, as will be described. As is known, the air preferably is preheated (e.g., to approximately 1150-1200° C.), and is moved through the blowpipe portion 22 at a high velocity (e.g., at approximately 200 meters/second).

Preferably, natural gas is directed along the injector lance 20 substantially in the direction indicated by arrow "B" in FIG. 1, i.e., substantially parallel to an axis 28 of the injector subassembly 20. After exiting the injector subassembly 20, the natural gas preferably mixes thoroughly with the air in the internal cavity 37 of the tuyere assembly 18 moving therethrough very quickly, as described above.

In one embodiment, the outlet end 30 is positioned in the internal cavity 37 so that the preselected flame configuration is not in direct contact with the walls 31 of the tuyere 24 (FIG. 8), nor in direct contact with the conduit 25. This position is preferred because the flames resulting from the combustion of the hydrocarbon(s) tends to damage the conduit 25 and the wall 31 of the tuyere 24 if the flames directly contact the wall 31, as will also be described. Also, direct contact of the flames with the conduit 25 damages the conduit.

As shown in FIG. 1, in one embodiment, the injector subassembly 20 preferably is substantially straight and is mounted on the blowpipe portion 22 so that the injector subassembly 20 extends through the conduit 25 into the bore 21. This arrangement is preferred because this arrangement permits relatively convenient removal of the injector subassembly 20, e.g., for maintenance.

As can be seen, for example, in FIG. 1, the conduit 25 and the walls 31 of the tuyere 24 include layers of refractory material (identified by "R"), as is known in the art. It will be understood by those skilled in the art that many different configurations of the tuyere 24 and the blowpipe portion 22 may be used in the tuyere assembly 18.

The invention herein is intended to promote the mixing of the fluid hydrocarbon(s) (e.g., natural gas) directed through the injector subassembly 20 with the air flowing through the blowpipe portion 22 and the tuyere 24, thereby resulting in combustion of a greater portion of the fluid hydrocarbon, as compared to the extent of combustion taking place when the fluid hydrocarbons are directed into blast furnaces via the tuyere assemblies of the prior art. As will be described, the present invention includes injector subassemblies and nozzles having certain preferred configurations for promoting such mixing. However, the positioning of the outlet end 30 in the internal cavity 37 is constrained by two competing factors.

First, when the outlet end 30 is positioned somewhat further into the tuyere chamber 19 (i.e., closer to the downstream aperture 16), correspondingly less time is allowed for combustion of the fluid hydrocarbon before the fluid hydrocarbon is carried into the blast furnace cavity 35 by the air moving through the blowpipe and the tuyere. In this situation, therefore, combustion of a greater portion of the fluid hydrocarbon may result from locating the outlet end somewhat further upstream. Combustion of somewhat more of the hydrocarbon while it is in the tuyere assembly is desirable, within limits, because this results in the generation of correspondingly more heat, and represents a greater utilization (i.e., less waste) of the hydrocarbon.

Second, however, it is possible to have too much combustion of the hydrocarbons in the tuyere assembly. When the outlet end 30 is positioned somewhat further into the blowpipe portion 22 (i.e., closer to the upstream end 23), too much combustion of the hydrocarbon in the blowpipe portion 22 and the tuyere 24 may result. This is because the more flames there are in the tuyere chamber 19 and the blowpipe bore 21, the more likely direct contact of the flame with the wall 31 (and the conduit 25) is, and the more rapidly the wall 31 of the chamber 19 and the conduit 25 defining the bore 21 deteriorate. Preferably, the combustion of the hydrocarbon is at least partially commenced in the chamber 19, and an envelope of relatively cooler air (e.g., at approximately 1200° C.) separates the flame from the walls of the chamber 19 (FIG. 8). Such relatively cooler air thus serves to protect the walls 31 of the chamber 19 (and the conduit 25), to an extent, from such flames. It is also preferred that combustion generally not take place in the blowpipe portion 22, for the reasons noted above.

Accordingly, the two factors described above are to be taken into account in determining an optimum design. Preferably, the (or each) outlet end 30 is positioned in the internal cavity 37 so that the flame configuration is spaced apart from the wall 31 of the chamber 19, thus avoiding direct impingement of the flame on the wall 31, i.e., direct contact of the preselected flame with the wall 31 of the chamber 19 is minimized. Preferably, the outlet end 30 is positioned so that direct contact of the flame with the conduit 25 is also minimized.

As shown in FIG. 2A, in one embodiment, the injector subassembly 20 has a main portion 34 which preferably is generally cylindrical, and also has an exterior surface 36 which is substantially round in cross-section, having an exterior diameter $D_1$. The main portion 34 preferably also includes a main portion bore 38 defined by an interior surface 40 having an interior diameter $D_2$. As can be seen FIG. 2A, it is also preferred that the nozzle 32 includes an interior cavity 42 with an interior diameter $D_3$ which is substantially less than the interior diameter $D_2$ of the main portion bore 38. The injector subassembly 20 also includes a transition portion 44 (positioned between the main portion 34 and the nozzle 32) with a chamber 46, the diameter of which varies along its longitudinal axis 28. The transition portion 44 extends between an outer transition portion end 48 thereof, at which the transition portion 44 is joined to the main portion 34, and an inner transition portion end 50 thereof, at which the transition portion 44 meets the nozzle 32 (FIG. 2A). From the foregoing, it can be seen that the main portion 34 extends between the transition portion 44 and an outer end 52 of the injector subassembly 20 (FIG. 1), and the nozzle 32 extends between the outlet end 30 and the transition portion 44. Preferably, each of the cavity 42 and the chamber 46 is substantially coaxial with the bore 38.

As shown in FIG. 2A, the exterior surfaces 51, 53 of the nozzle 22 and the transition portion 44 respectively preferably have the same exterior diameter as the main portion 34. However, it will be understood by those skilled in the art that the exterior diameters of the nozzle 32 and the transition portion 44 need not be substantially the same as the exterior diameter of the main portion 34.

The injector subassembly 20 disclosed in FIG. 2A is tapered internally in order that the injector subassembly may have an optimal length-to-diameter ratio for the apertures in the nozzle. The optimal length-to-diameter ratio of 1.5 or greater is beneficial because it causes the flow of natural gas through an aperture (e.g., apertures 54, 56, 58) to be turned more effectively toward the axis of the aperture. A smaller length-to-diameter ratio results in flow which tends to continue parallel to the axis 28, reducing the effectiveness of the natural gas distribution by the injector subassembly 20.

As shown, the aperture 54 extends from the cavity 42 to the outlet end 30, and is substantially aligned with the axis 28. In one embodiment, the nozzle 32 preferably includes an aperture 54 and two sets of radially positioned apertures, generally designated "X" and "Y" in FIG. 2A. It will be understood that the apertures X may be spaced apart from each other in any suitable manner, as may the apertures Y. There may be any suitable number of apertures X and Y. However, each set of radially positioned apertures (X and Y) preferably includes three apertures which are equally radially spaced apart from each other and have axes respectively, which axes are aligned in planes $P_1$ and $P_2$ for each of sets X and Y respectively. For clarity of illustration, only an aperture 56 in the first set X of radially positioned apertures and an aperture 58 in the second set Y of radially positioned apertures are shown. It is also preferred that the apertures 56 and the apertures 58 are radially offset, or displaced, from each other respectively by approximately 60°. As shown in FIG. 2A, each of the apertures 56, 58 extends between the cavity 42 and the exterior surface 51.

Preferably, the first set X of apertures is spaced apart from the outlet end 30 by a first distance 60, and the second set Y of apertures is spaced apart from the outlet end 30 by a second distance 62. In one embodiment, $P_1$ is positioned at approximately 20 mm. from the outlet end 30, and $P_2$ is positioned at approximately 40 mm. from the outlet end 30. However, it will be understood that the positioning of the sets of apertures X, Y relative to the outlet end 30 is variable in order to achieve optimum results, as will be described. Accordingly, the nozzle 32 includes a plurality of apertures which are positioned to direct the fluid hydrocarbon into the internal cavity in a predetermined pattern.

In use, the air is directed through the internal cavity 37 in the direction indicated by arrow A and the fluid hydrocarbon is directed through the injector subassembly 20 in the direction indicated by arrow B, and through the nozzle 32, into the internal cavity 37 (FIG. 1). The nozzle 32 is formed to provide a predetermined flame configuration which, preferably, is relatively hot, but also preferably is formed so that the flame configuration is spaced apart from the conduit 25 of the blowpipe portion 22 or the wall 31 of the tuyere 24.

Additional embodiments of the invention are shown in FIGS. 2B, 3A, 3B and 4A-7B. In FIGS. 2B, 3A, 3B and 4A-7B, elements are numbered so as to correspond to like elements shown in FIGS. 1 and 2A.

Figure 2B:
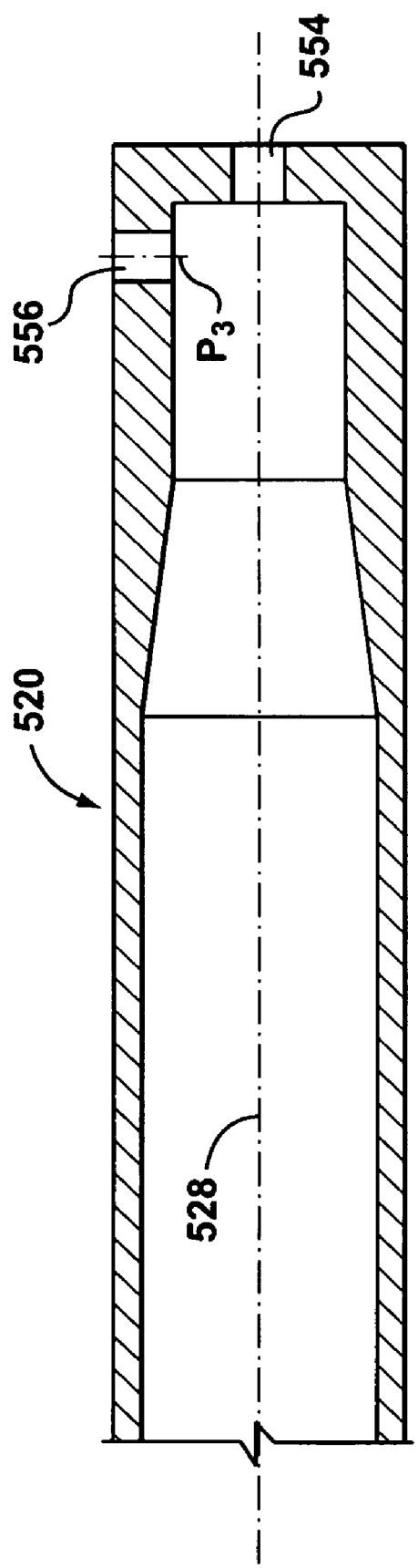
FIG. 2B is a cross-section of an alternative embodiment of the injector lance of the invention.

Another alternative embodiment of the injector subassembly 520 of the invention is shown in FIG. 2B. In this embodiment, the nozzle 532 includes seven apertures, all disposed in substantially the same plane $P_3$ and substantially equally radially spaced apart from each other. For clarity of illustration, only aperture 556 is shown in FIG. 2C. The nozzle 532 preferably also includes an aperture 554 substantially coaxial with axis 528.

The structure of the nozzle 532 is substantially the same as that of the nozzle 32 disclosed in FIG. 2A. Because the bore 339 has substantially the same interior diameter along its length, the length-to-diameter ratio of the injector subassembly 520 is somewhat sub-optimal. However, as will be appreciated by those skilled in the art, the cost of manufacturing the injector subassembly 520 would be substantially less than the cost of manufacturing the injector subassembly 20.

Figure 3A:
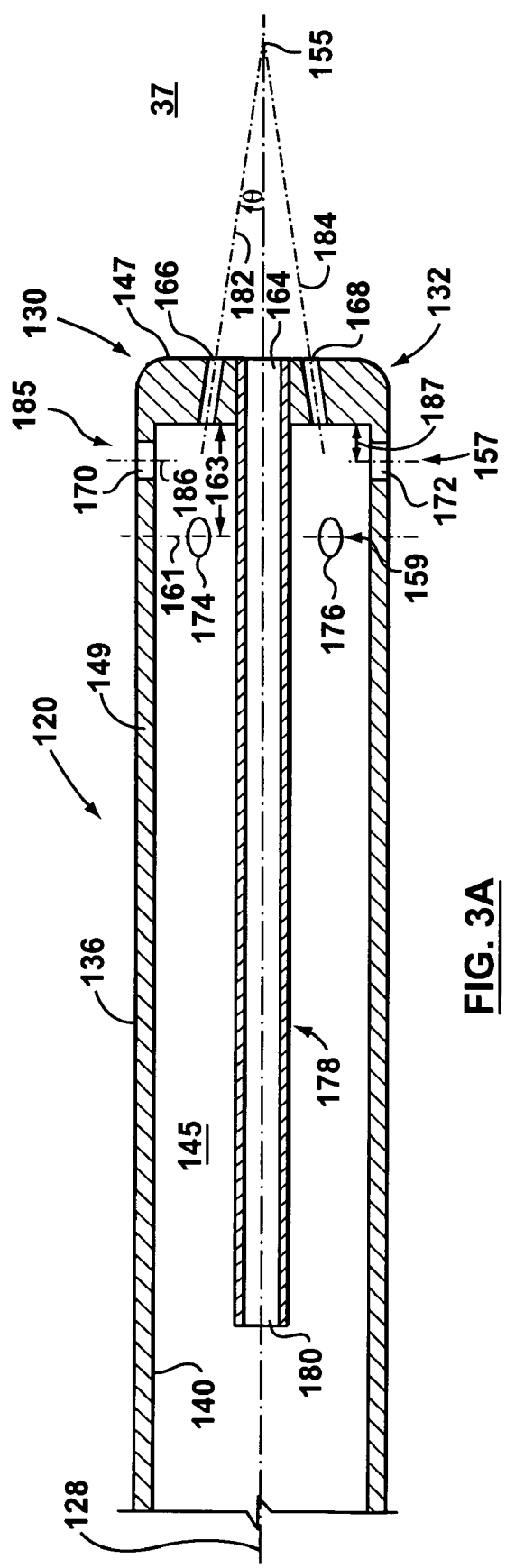
FIG. 3A is a cross-section of another embodiment of an injector lance of the invention.
Figure 3B:
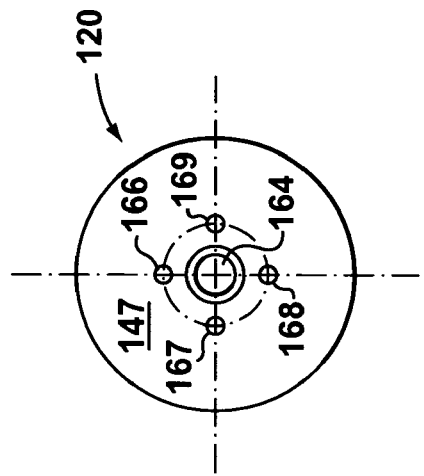
FIG. 3B is an end view of the injector lance of FIG. 3A.

In an alternative embodiment shown in FIGS. 3A and 3B, an injector subassembly 120 of the invention preferably includes an internal tube 178 opening into an axial aperture 164 in a nozzle 132. Preferably, the internal tube 178 defines an internal tube bore 180 therein and an annulus 145 therearound. In one embodiment, the injector subassembly 120 preferably is adapted for directing a first fluid hydrocarbon through the annulus 145 to the nozzle 132, and also for directing a second fluid hydrocarbon through the internal tube 178 to exit at the nozzle 132. Preferably, the first and second hydrocarbons are mixed together as they are directed by the nozzle 132 into the internal cavity 37 to provide a flame having a preferred flame configuration (FIG. 8), i.e., spaced apart from the conduit of the blowpipe portion in which the injector subassembly is positioned (not shown) and the wall of the chamber of the tuyere attached thereto (not shown) to minimize direct contact of the flame therewith.

Preferably, the internal tube 178 is defined by a longitudinal axis 128 and the annulus 145 is coaxial with the longitudinal axis 128. As can be seen in FIG. 3A, the outlet end 30 is at least partially defined by an end wall 147.

In one embodiment, the injector subassembly preferably includes an internal tube aperture 164 substantially coaxial with the longitudinal axis 128, for directing the second hydrocarbon into the internal cavity 37, as will be described. The internal tube bore 180 is in fluid communication with the axial aperture 164. Also, it is preferred that the injector subassembly 120 includes one or more end wall apertures 166, 167, 168, and 169 for directing the first hydrocarbon into the internal cavity 37. (It will be understood that there may be as many end wall apertures as are suitable, and such apertures may be spaced apart from each other in any suitable manner.)

It is also preferred that the nozzle 132 additionally includes a number of annulus apertures, certain of which are shown in FIG. 3A and designated by reference numerals 170, 172, 174, and 176. The annulus apertures preferably are disposed in a lance wall 149 proximal to the end wall 147 in fluid communication with the annulus 145, for directing the first fluid hydrocarbon into the internal cavity 37.

In one embodiment, it is preferred that the internal tube aperture 164 is substantially coaxial with the longitudinal axis 128. Also, each of the end wall apertures 166, 167, 168, and 169 preferably is defined by respective end wall aperture axes which, preferably, are non-parallel with the longitudinal axis 128. As shown in FIG. 3B, for example, axes 182, 184 are non-parallel to the longitudinal axis 128 so that the first hydrocarbon directed out of apertures 166 and 168 respectively meets the second hydrocarbon directed through the internal tube aperture 164 substantially at a point 155 which is a predetermined distance from the end wall 147. (It will be understood that cross-sections of the apertures 166, 168 only are provided for clarity of illustration, and the cross-sections of apertures 167, 169 would be substantially similar thereto.)

In one embodiment, the annulus apertures includes a first set 157 of first annulus apertures. (In FIG. 3A, for clarity of illustration, the only first annulus apertures shown are apertures 170 and 172. It will be understood that there may be as many first annulus apertures as are suitable, and these apertures may be spaced apart from each other in any suitable manner.) Preferably, each first annulus aperture is substantially defined by a respective axis thereof which is disposed substantially orthogonal to the longitudinal axis 128, substantially in the same plane. For example, as shown in FIG. 3A, the first annulus apertures 170, 172 have axes in the same plane 186. It is also preferred that the plane 186 is spaced apart from the end wall 147 by a predetermined distance 187 (FIG. 3A).

In one embodiment, the annulus apertures include a second set 159 of second annulus apertures. (In FIG. 3A, for clarity of illustration, the only second annulus apertures shown are apertures 174 and 176. It will be understood that there may be as many second annulus apertures as are suitable, and these apertures may be spaced apart from each other in any suitable manner.) Preferably, each second annulus aperture is substantially defined by a respective axis thereof which is disposed substantially orthogonal to the longitudinal axis 128, substantially in the same plane. For example, as shown in FIG. 3A, the apertures 174, 176 have axes located in the same plane 161. It is also preferred that the plane 161 is spaced apart from the end wall 147 by a predetermined distance 163 (FIG. 3A).

The apertures preferably are formed with any suitable diameter, or diameters, as the case may be. In one embodiment, the aperture 164 preferably has an inner diameter of approximately 7 mm. and an outer diameter of approximately 10 mm.

In use, the second fluid hydrocarbon (not shown) is directed along the tube 178 to the aperture 164. The second fluid hydrocarbon may be any suitable hydrocarbon, for example, any one of coal tar oil, bunker "C" oil, or waste oils. It is also preferred that the first fluid hydrocarbon is natural gas, which is directed through the annulus apertures.

Preferably, each of the axes 182, 184 defines an acute angle $\phi$ relative to the axis 128 at the point 155 spaced apart from the outlet end 130. Preferably, such acute angle is approximately 8°. Preferably, all four apertures 166, 167, 168, 169 are substantially equally radially spaced apart from each other. In one embodiment, all four apertures 166, 167, 168, 169 are oriented similarly relative to the axis 128, i.e., their respective axes each respectively form an angle of approximately 8° with the axis 128. Also, the respective outer ends of the apertures 166, 167, 168, 169 preferably are radially spaced apart from each other to define a substantially circular pattern with a diameter of approximately 18 mm. (FIG. 3B).

As described above, in one embodiment, it is preferred that the first set 157 of first annulus apertures includes a total of four apertures, i.e., apertures 170 and 172 and two additional apertures which are not shown for clarity of illustration. It is also preferred that the first annulus apertures are substantially equally radially spaced apart from each other. In one embodiment, these apertures preferably each have a diameter of approximately 7.5 mm., and the axes thereof are preferably positioned approximately 20 mm. from the end wall 147.

As described above, it is also preferred that the second set 159 of annulus apertures includes a total of four apertures, i.e., apertures 174 and 176 and two additional apertures which are not shown for clarity of illustration. It is also preferred that the second annulus apertures are substantially equally radially spaced apart from each other. In one embodiment, these apertures preferably each have a diameter of approximately 7.5 mm., and the plane defined by the axes thereof is preferably positioned approximately 35 mm. from the outlet end 130.

It is also preferred that each second annulus aperture is radially offset respectively from each first annulus aperture. Preferably, the offset is 45° radially. For example, as shown in FIG. 3A, the aperture 174 is radially offset from the aperture 170 by approximately 45°.

It will be understood by those skilled in the art that the apertures may be oriented in order to provide a "swirl" effect in the hydrocarbons exiting therefrom. The swirling effect is known to promote the desired flame configuration.

It will be understood that FIG. 8 shows only the general positioning of the injector subassemblies disclosed in FIGS. 1, 2A, 2B, 3A, and 3B, and the general outlines and positioning in the tuyere of the flames (and the flame configurations) resulting when hydrocarbons are directed through such injector subassemblies. However, the differences in the flame configurations provided by these different injector subassemblies can be seen in FIGS. 9, 10A, and 10B, described below.

As can be seen in FIG. 1, and as is known, the wall(s) 31 defining the chamber 19 at the upstream aperture 17 preferably are positioned so that such wall(s) 31 are axially offset relative to the surface of the conduit 25 defining the bore 21 at the inward end 26. Preferably, the wall 31 is disposed outwardly (i.e., further away from a central axis) relative to the conduit 25 at the inward end 26 of the blowpipe portion 22. However, as shown in FIG. 1, it is also preferred that the differences in elevation are relatively small. The configuration shown in FIG. 1 is preferred to the configuration of the wall 31 and the conduit 25 at the inward end 26 which is shown in FIG. 4A.

Figure 4A:
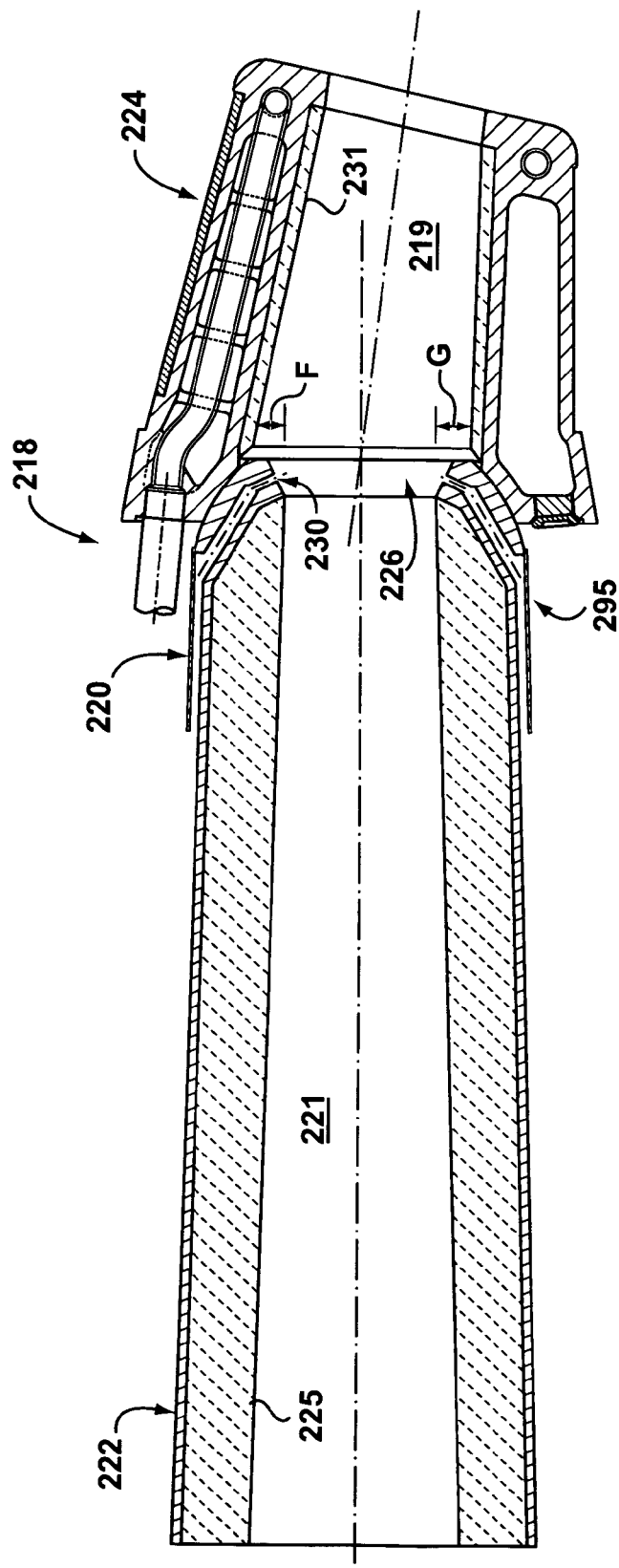
FIG. 4A is a cross-section of another embodiment of the tuyere assembly of the invention including an embodiment of a ring injector subassembly of the invention, drawn at a smaller scale.

The configuration shown in FIG. 4A defines relatively large offset distances "F" and "G" in a chamber 219 between the surfaces of walls 231 thereof and a conduit 225 respectively. It is understood that, depending on the position of the outlet end of the injector subassembly, parts of the air and natural gas (or other fluid hydrocarbon(s)) directed into the chamber 219 may tend to form an eddy in each of the areas designated F and G respectively, with the result that one or more flames tend to be "anchored" thereat, i.e., the flame(s) may directly contact the wall 231 in areas F and/or G. This may result in a "hot spot" inside tuyere 224 at its walls 231, leading to relatively rapid deterioration of the walls 231 of the tuyere 224 adjacent to areas F and G. Relatively rapid deterioration of the conduit 225 of the blowpipe portion 222 at the inward end 226 may also result.

As can be seen in FIG. 1, the relatively smaller gap between the surfaces of the walls 31 and the conduit 25 respectively in the embodiment shown therein has the advantage that such relatively small gap is not sufficiently large to create an "eddy" effect which would anchor a flame.

Figure 4B:
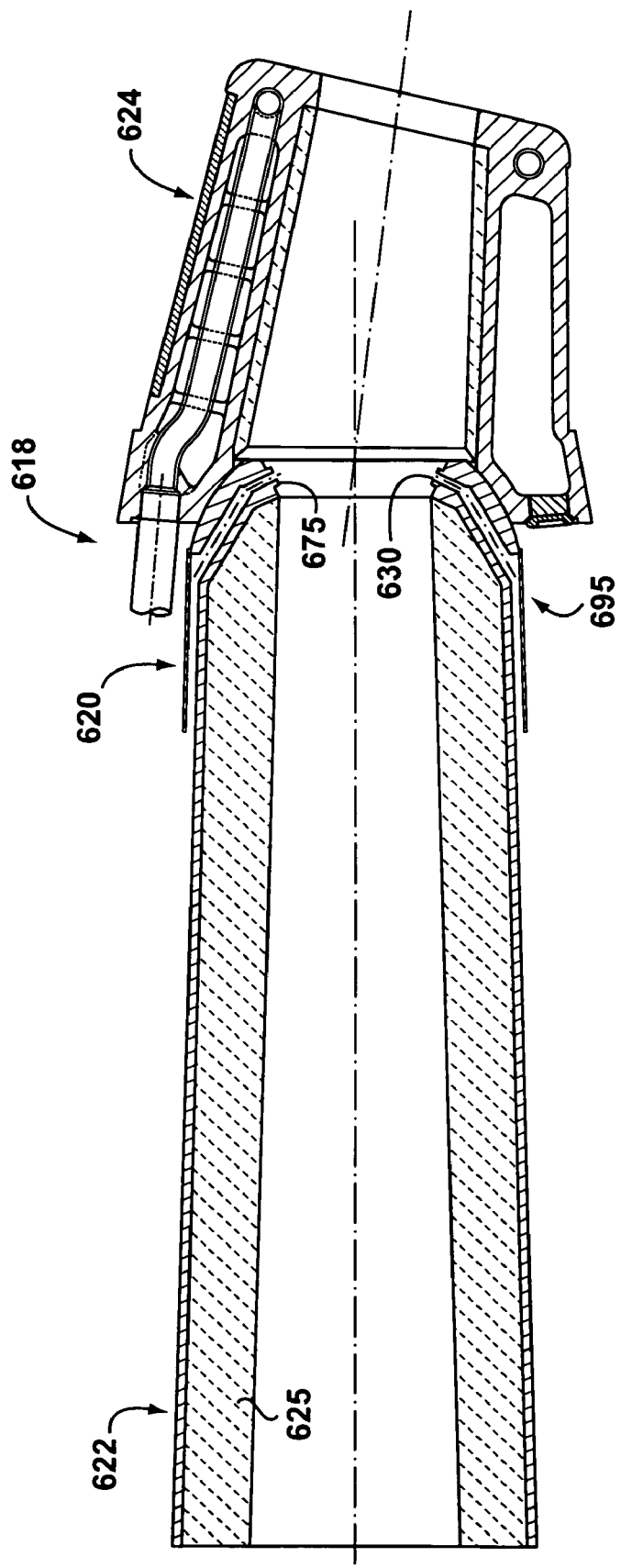
FIG. 4B is a cross-section of another embodiment of the tuyere assembly of the invention including another embodiment of a ring injector subassembly of the invention.

Additional alternative embodiments of the tuyere assemblies 218 and 618 shown in FIGS. 4A and 4B respectively are intended to position outlet ends of the injector subassemblies therein so as to discourage the formation of hot spots at F and G. In the tuyere assembly 218, a blowpipe 222 includes an injector subassembly 220 including one or more injector units 295, each injector unit 295 including an outlet end 230 positioned generally at an inward end 226 of the blowpipe 222 (FIG. 4A). It is preferred that the injector units 295 are each disposed at least partially in the conduit 225. Preferably, the outlet ends 230 are substantially equally radially spaced from each other. Each outlet end 230 is positioned for directing fluid hydrocarbon(s) into the internal cavity 237 for combustion of the hydrocarbon(s) to provide a flame having a preselected flame configuration, as shown by modelling illustrated in FIG. 10A.

It is also preferred that each outlet end 230 is positioned to direct the fluid hydrocarbon into the internal cavity 37 so that direct contact of a flame 243 resulting from the flow of hydrocarbons through the outlet ends 230 (FIG. 10A) with the wall 231 of the chamber 219 is minimized.

It will be understood by those skilled in the art that any suitable number of outlet ends 230 (i.e., any suitable number of injector units 295) may be included in the injector subassembly 220. Also, it will be appreciated by those skilled in the art that the outlet ends may be positioned relative to each other, radially and axially, in any suitable manner. Preferably, the injector subassembly 220 includes six outlet ends 230 which are substantially equally radially spaced apart from each other. For clarity of illustration, only two injector units 295 are shown in FIG. 4A.

Figure 6:
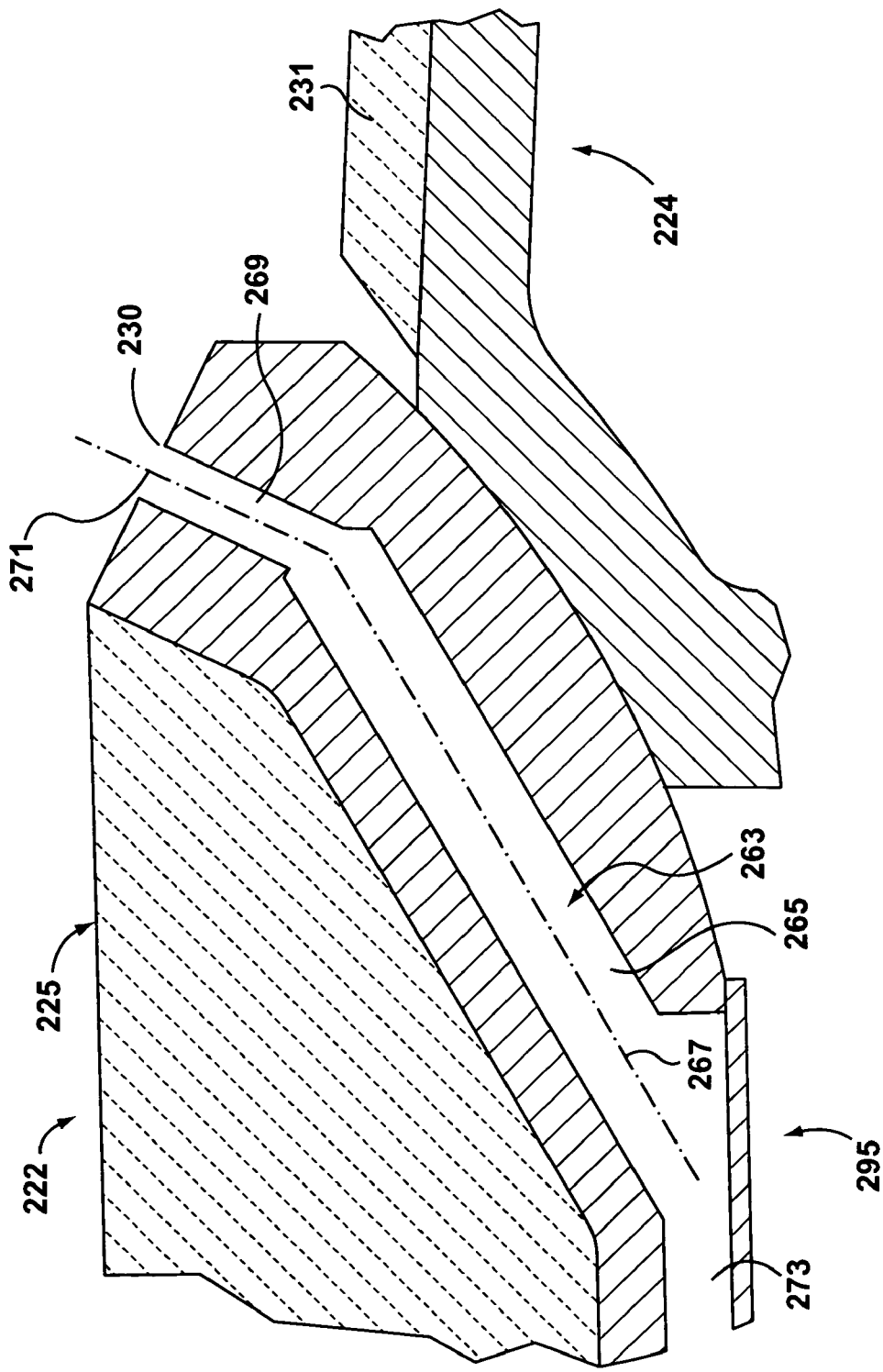
FIG. 6 is a cross-section of a portion of the blowpipe of FIG. 4A.

The injector unit 295 including the first outlet 230 preferably includes a channel 263 with a first portion 265 defined by a first portion axis 267 and a second portion 269 defined by a second portion axis 271 (FIG. 6). The channel 263 also includes a third portion 273 extending from the first portion 265. In one embodiment, natural gas is transmitted into the channel 263 at a third portion 273 and thence through the first and second portions 265, 269 respectively.

As can be seen in FIG. 4A, the first portion axis 237 is generally oriented to form an acute angle relative to the axis 227. In the embodiments for which certain modelling was done (as described below), the acute angles are each approximately 63°. However, it will be understood that the configuration and positioning of the outlet ends 230 is intended to maximize mixing of natural gas with air and also provide a flame which will be positioned as desired, and various alternative configurations will occur to those skilled in the art.

Figure 5:
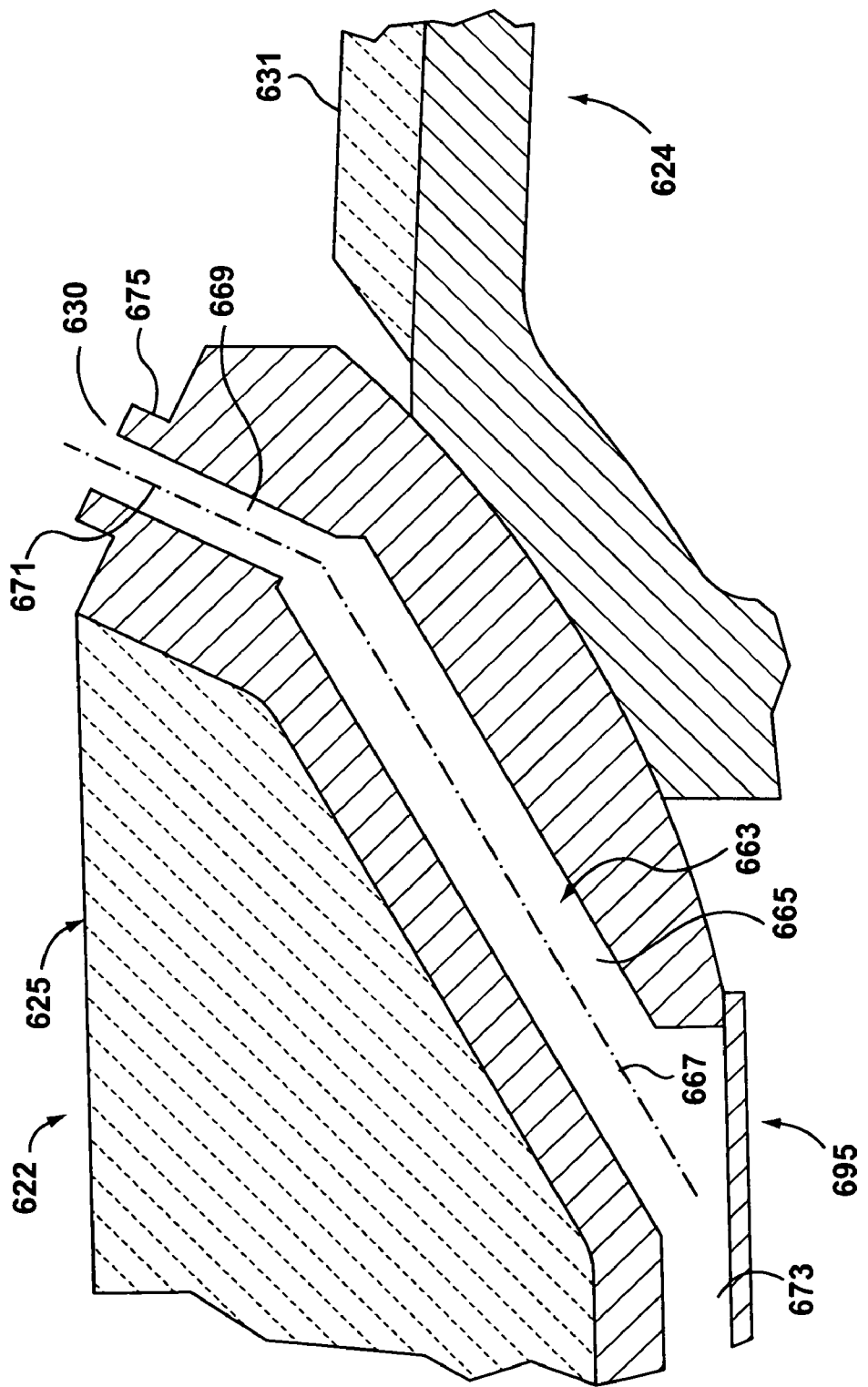
FIG. 5 is a cross-section of a portion of the blowpipe of FIG. 4B, drawn at a larger scale.

Alternative embodiments of the tuyere assembly 618 and the injector subassembly 620 including a number of injector units 695 are shown in FIGS. 4B and 5. As shown in FIGS. 4B and 5, the injector unit 695 includes an outlet end 630, which includes a boss (or collar) 675. The injector unit 695 includes a channel 663, which has a first portion 635 defined by a first portion axis 667 (FIG. 5). The channel 663 also includes a second portion 669 defined by a second portion axis 671. Also, the channel 663 includes a third portion 673 extending from the first portion 665. In one embodiment, natural gas is transmitted into the channel 663 at the third portion 673 and thence through the first and second portions 665, 669 respectively.

As can be seen in FIG. 4B, the first portion axis 667 is generally oriented to form acute angles relative to the axis 627 of the blowpipe portion 622. In the embodiments for which modelling was done (as described below), such acute angles are each approximately 63°. However, it will be understood that the configuration and positioning of the outlet ends 630 is intended to maximize mixing of natural gas with air and also provide a flame which will be positioned as desired, and various alternative configurations will occur to those skilled in the art.

The collar 675 is for directing the fluid hydrocarbon into the internal cavity 637 so that direct contact of the flame with the wall 631 of the tuyere 624 is minimized.

Figure 7A:
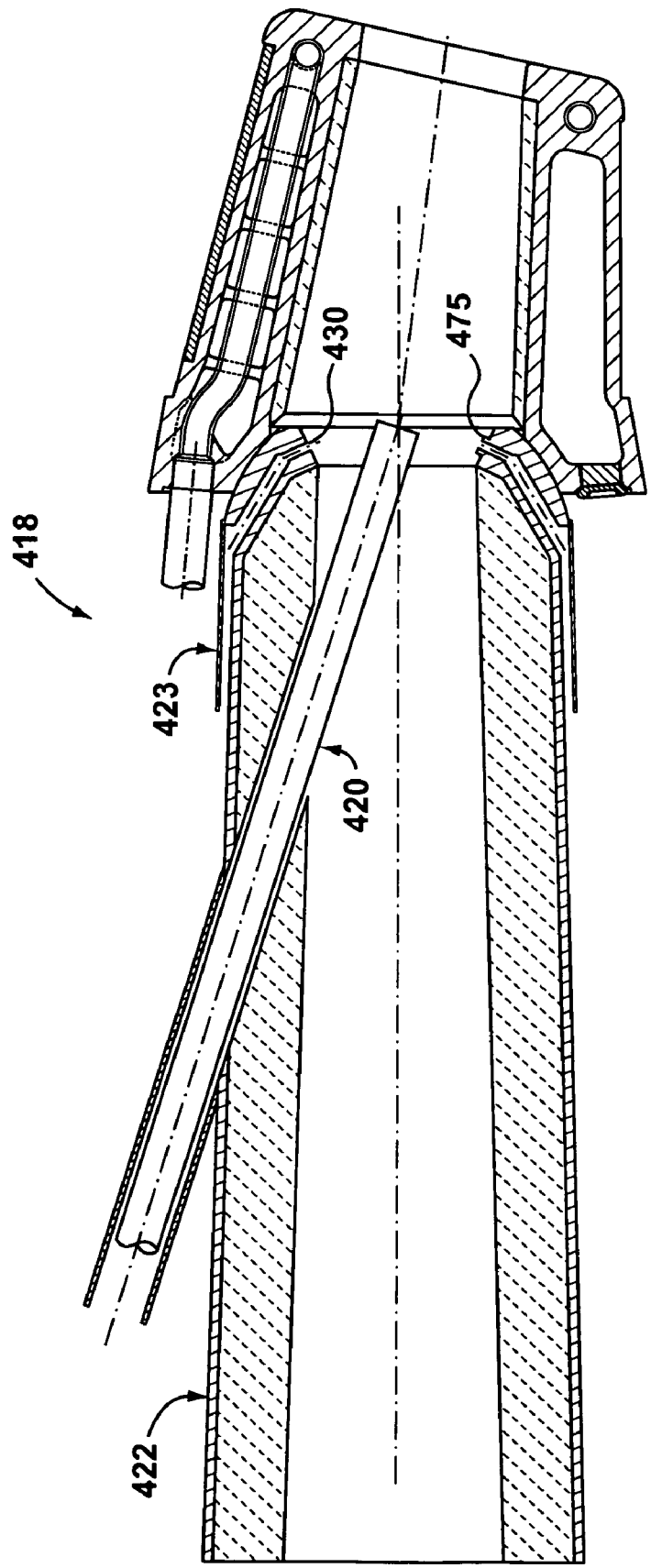
FIG. 7A is a cross-section of another embodiment of the tuyere assembly of the invention, drawn at a smaller scale.

Another embodiment of a tuyere assembly 418 is shown in FIG. 7A. As can be seen in FIG. 7A, the tuyere assembly 418 includes a blowpipe 422 with an injector lance 420 extending therein and a tuyere 424. The blowpipe 422 preferably also includes an injector ring subassembly 423.

In one embodiment, the injector lance 420 preferably is substantially the same as the injector subassembly 120 shown in FIG. 3A, and the injector ring subassembly 423 preferably is substantially the same as the injector subassembly 620 shown in FIGS. 4B and 5. However, it will be apparent to those skilled in the art that various combinations of lances and injector rings are possible.

Figure 7B:
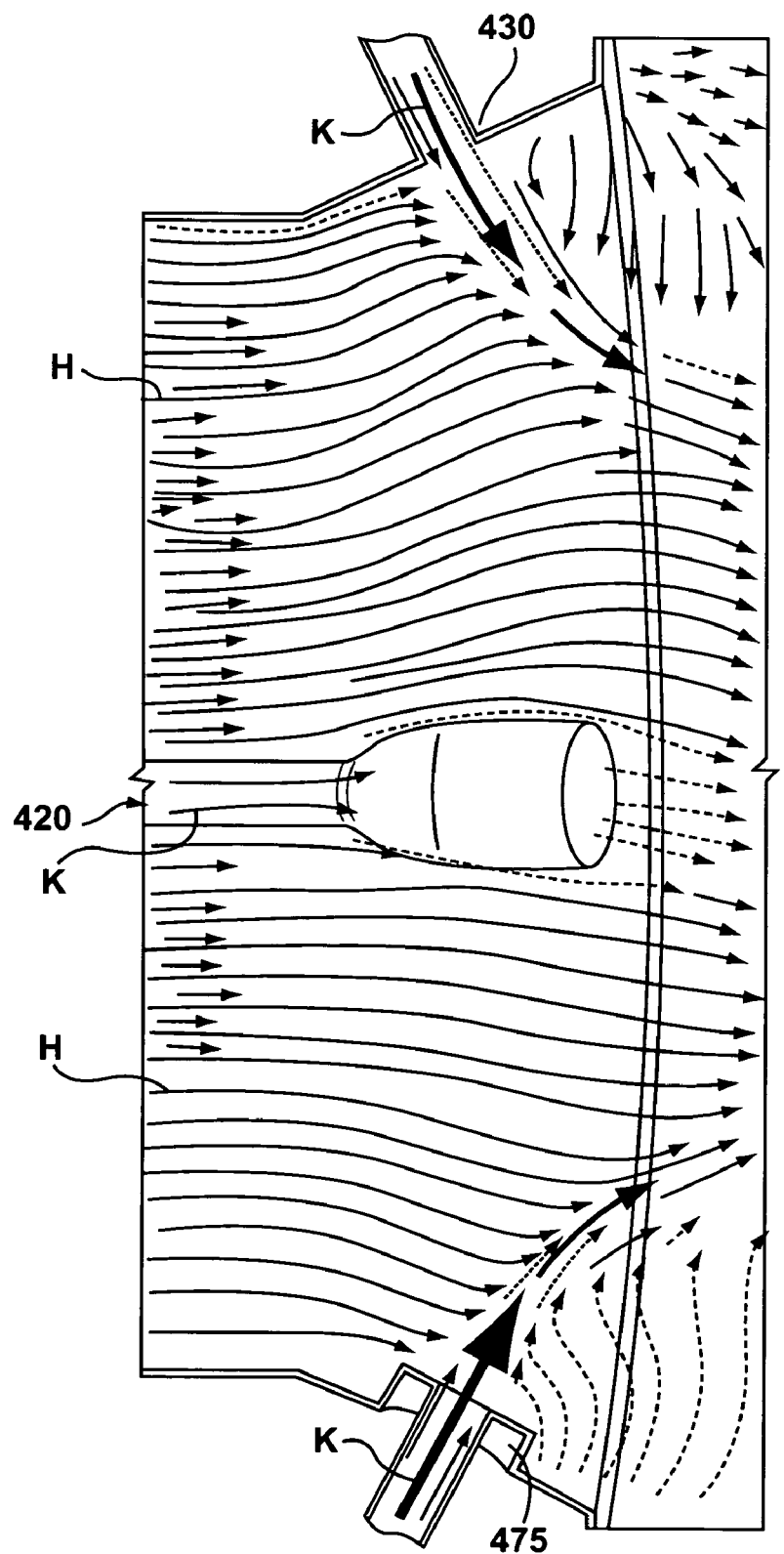
FIG. 7B is a schematic illustration representing the flow of air and gas through the blowpipe as modelled based on the tuyere assembly of FIG. 7A, drawn at a larger scale.

The flow of air and fluid hydrocarbons through internal cavity 437 is schematically illustrated in FIG. 7B, based on the tuyere assembly 418. (The arrows designated as "H" represent air flow, and the arrows designated as "K" represent hydrocarbon(s).) Based on FIG. 7B, it appears that the boss (or collar) 475 serves to channel natural gas somewhat further towards the centre of the internal cavity 437 than does the outlet end 430, which does not have a boss or collar. Accordingly, the boss 675 appears to provide a functional advantage.

EXAMPLES

The embodiments described above have been assessed in detail. The assessments were performed using highly sophisticated combustion modeling software by the Canadian Energy Technology Centre, an agency of the Canadian government. The software uses a computational fluid dynamic modelling approach based on flamelet libraries to calculate the position of the flame front in the system being studied. Many other characteristics, such as temperatures, pressures, and flow velocities, are calculated using the software. In this approach, the calculated location of the combustion flame front within the tuyere assembly (FIG. 8) provides a measure of the efficiency of the injector subassembly designs described above. Additional information on gas composition, flow and temperature is also generated by the model, certain output of which is schematically represented in FIG. 8. The manner in which the modelling was done is generally as described in Chui, E. H., Scott, K. A., Harrison, F. W., and McFadyen, N. K., "Modeling the Co-injection of Coal and Natural Gas in a High Speed Environment", Seventh International Conference on Technologies and Combustion for a Clean Environment (2003).

In summary, model runs indicate that a significant improvement in natural gas utilization is achieved by using the embodiment of the lance 120 (shown in FIGS. 3A and 3B). Both the average temperature of the gases exiting the tuyere (FIG. 9) and the natural gas combustion completeness (Table I) are substantially higher for the case of the axial lance 120 than for the embodiments of the tuyere assembly disclosed in FIGS. 1 and 2A.

Figure 9:
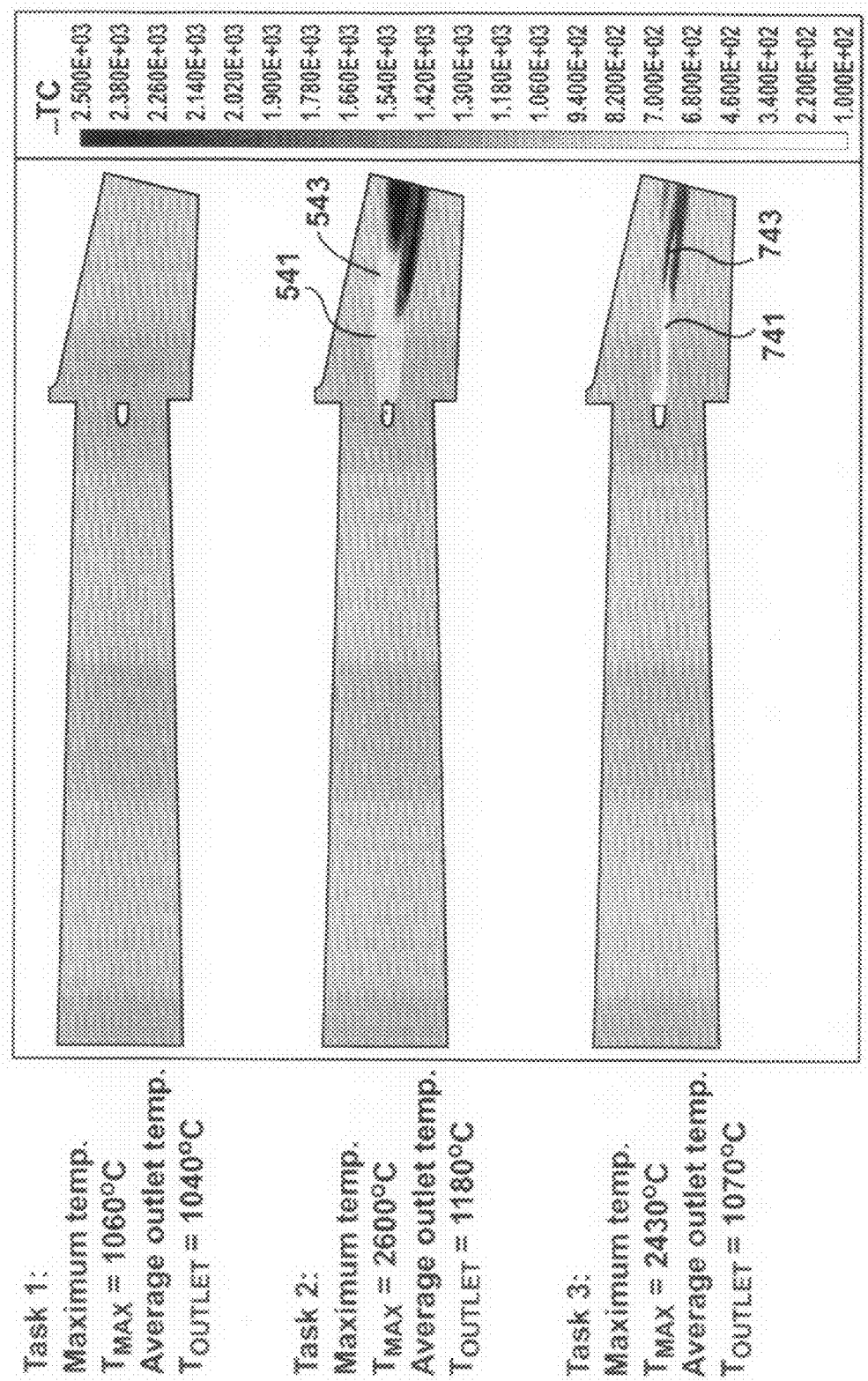
FIG. 9 shows schematic illustrations of modelling of the performance of the tuyere assembly of FIG. 1 in selected conditions showing temperature profiles.

In the example schematically illustrated in FIG. 9 and identified as "Task 1", the modelling was done on the basis of no natural gas flow, to provide a baseline for the purpose of comparison. Instead, the modelling was based on directing only superheated air through the blowpipe. (In this modelling, the tuyere assembly is as shown in FIG. 1, but no hydrocarbons are passed through the lance.)

In "Task 2", the result of directing natural gas through the eight-hole lance shown in FIG. 2B is modelled. A flame 541 resulting from combustion of the hydrocarbon(s) directed into the internal cavity 537 by the injector subassembly 520 having a flame configuration 543 is shown in Task 2 in FIG. 9.

Figure 11:
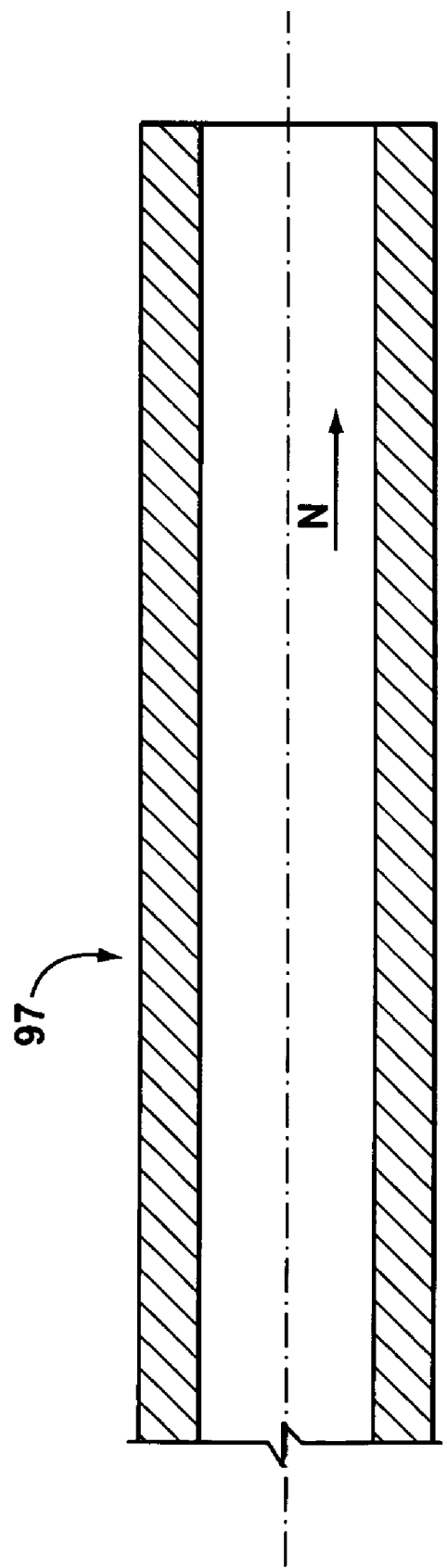
FIG. 11 is a cross-section of an open pipe lance of the prior art.

In "Task 3" the result of a flow of natural gas through a prior art open pipe lance 97, as shown in FIG. 11, is modelled. In FIG. 11, the flow of hydrocarbon(s) is in the direction indicated by arrow "N". A flame 741 having a flame configuration 743 is shown in Task 3 in FIG. 9.

TABLE I

Completeness of NG Combustion - FIG. 9

$$\text{combustion completeness} = \frac{O_2 \text{ in } H_2O, CO, \text{ and } CO_2}{O_2 \text{ required for stoichiometric combustion}}$$

| Task | Combustion |
|---|---|
| Task 1-Baseline case | Combustion completeness = N/A |
| Task 2-8 hole lance | Combustion completeness = 43% |
| Task 3-Open pipe lance | Combustion completeness = 17% |

The circumferential lance approach (i.e., the injector subassembly shown in FIGS. 4A and 6) was also modeled. "Task 4" schematically illustrates the performance of the six-hole ring injector subassembly, as modelled. This approach resulted in a large increase in the average temperature of the gases leaving the tuyere (FIG. 10A) and another significant improvement in combustion completeness (Table II). A flame 241 resulting from combustion of hydrocarbon(s) directed into the internal cavity 237 by the injector subassembly 220 having a flame configuration 243 is shown in Task 4 in FIG. 10A.

"Task 5" schematically illustrates the performance of the seven-hole lance disclosed in FIG. 2A, as modelled. A flame 41 resulting from combustion of hydrocarbon(s) directed into the internal cavity 37 by the injector subassembly 20 having a flame configuration 43 is shown in Task 5 in FIG. 10A.

Refinement of the axial lance in Task 5 as compared to that modelled in Task 2 (i.e., by changing the injector subassembly from that shown in FIG. 2B (modelled in Task 2) to that shown in FIG. 2A (modelled in Task 5) resulted in increased average gas temperature. This suggests that there may be an opportunity for improving tuyere assembly performance through design optimization.

TABLE II

Figure 10A:
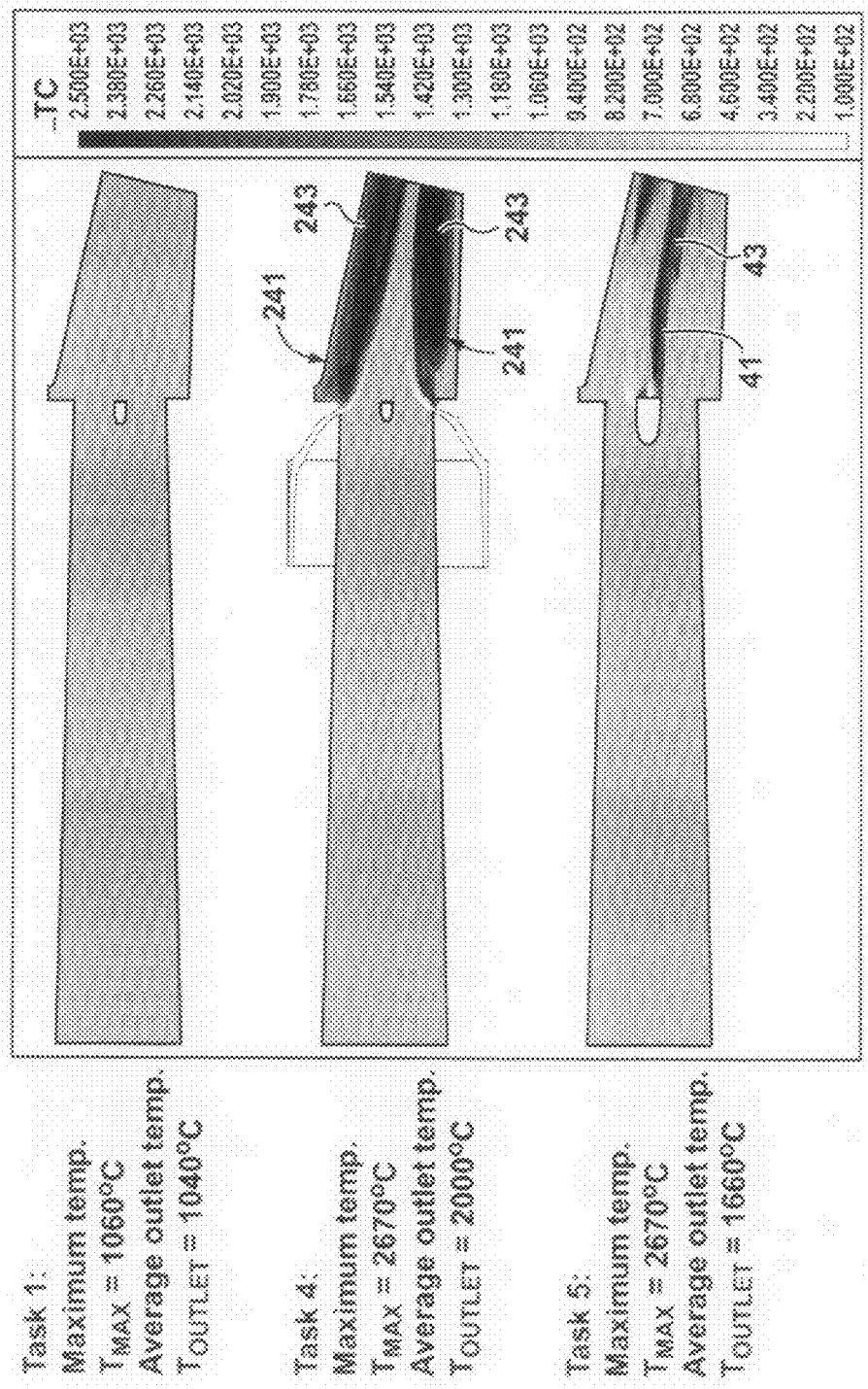
FIG. 10A provides schematic illustrations of modelling of the performance of embodiments of the tuyere assembly of the invention in selected conditions showing temperature profiles.

Completeness of NG Combustion - FIG. 10A

| Task | Combustion |
|---|---|
| Task 1 - Baseline case | Combustion completeness = N/A |
| Task 4 - Ring injection | Combustion completeness = 61% |
| Task 5 - 7 hole lance | Combustion completeness = 42% |

As described above, liquid hydrocarbons such as oil are also commonly injected at the tuyere. Consequently, another approach investigated was the use of a combination coaxial lance for injection of natural gas and liquids. The natural gas flow was designed to disperse the liquid material in addition to achieving good mixing of natural gas and the blast oxygen. Good results have been achieved using this approach: natural gas combustion completeness is similar to that for the natural gas-only axial lance of Task 5 (Tables II and III) and good dispersion and heating of the oil is predicted (Table III).

TABLE III

Results for Coaxial NG/Liquid Hydrocarbon Lance (FIGS. 3A, 3B)

| | |
|---|---|
| Average Outlet Temperature (° C.) | 1360 |
| Maximum Temperature (° C.) | 2680 |
| NG Combustion Completeness (%) | 41 |

Based on the foregoing examples, it appears that the highest outlet temperature would be achieved using the injector subassembly 230 described above. However, as shown in FIG. 10A, the injector subassembly 230 involves a risk of flames damaging the walls of the tuyere 224 (and/or the walls of the blowpipe portion 222) when the volumes and rates of flow of air and natural gas are decreased. In practice, such a decrease takes place, for example, in preparation for ceasing operation of the blast furnace, as is required from time to time.

Figure 10B:
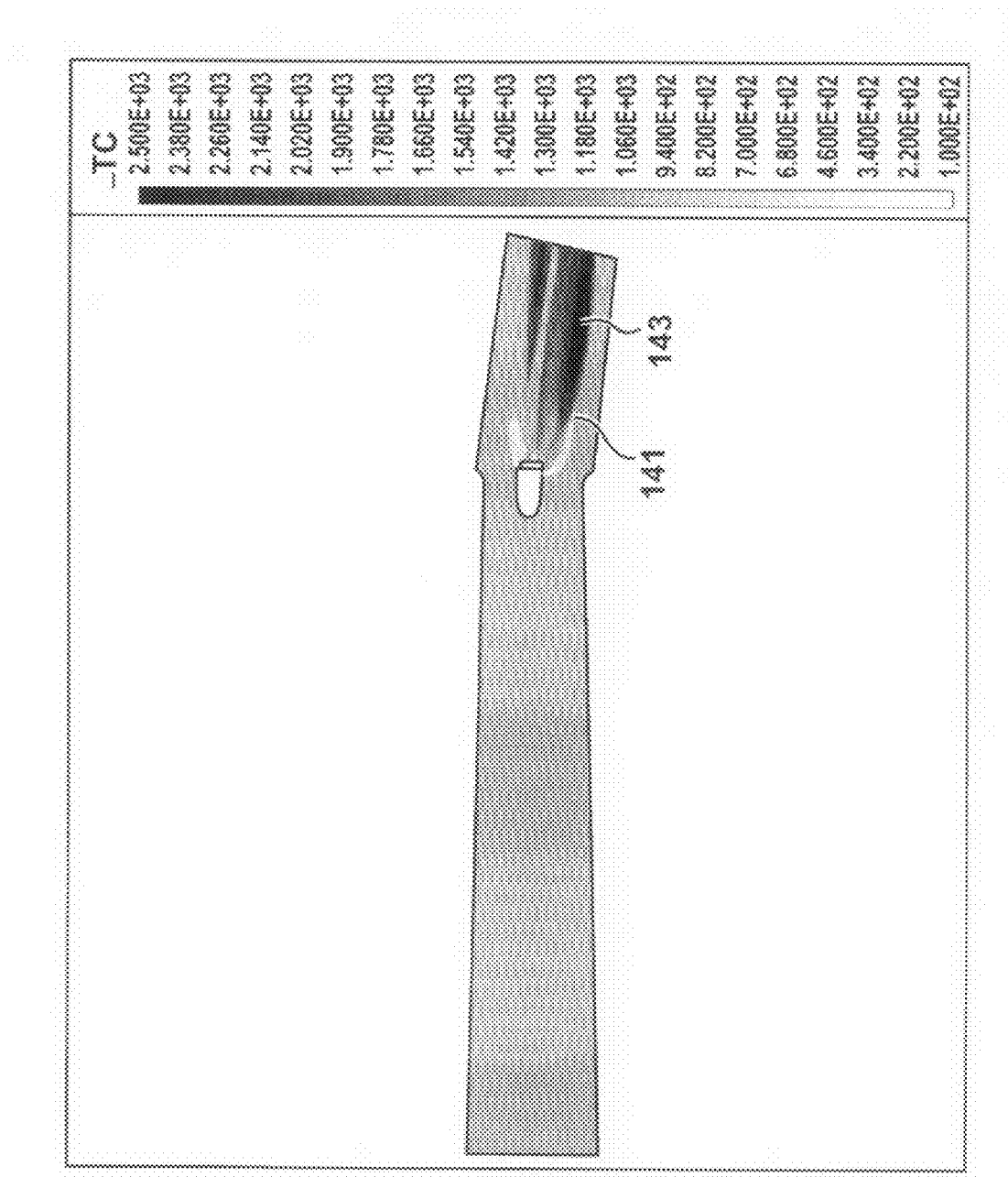
FIG. 10B provides another schematic illustration of modelling of the performance of an embodiment of the tuyere assembly of the invention showing temperature profiles.

FIG. 10B shows that the flame configuration resulting from the injector subassembly 120 is adequately spaced apart from the conduit 125 and the walls 131 of the tuyere 124. A flame 141 resulting from combustion of hydrocarbon(s) directed into the internal cavity 137 by the injector subassembly 120 having a flame configuration 143 is shown in Task 8 in FIG. 10B. Therefore, based on the modelling, such injector subassembly 120 appears to provide the optimum flame configuration, on balance.

The embodiment of the tuyere assembly disclosed in FIG. 7A would appear to provide for very good performance under ordinary operating conditions and also provide flexibility when the blast furnace operation is reduced from full production. In particular, the embodiment shown in FIG. 7A would permit control of the flow of hydrocarbons through the first and second injector subassemblies separately.

Any element in a claim that does not explicitly state "means for" performing a specified function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. A tuyere assembly for directing air and at least one fluid hydrocarbon into a cavity in a blast furnace, the tuyere assembly comprising:
    a blowpipe portion comprising an inward end thereof and a conduit defining a bore, the blowpipe portion being adapted for directing said air through the bore to the inward end;
    a tuyere comprising an upstream opening adjacent to the inward end and a downstream opening, the upstream and downstream openings being connected by a chamber defined by at least one wall thereof, the downstream aperture being in fluid communication with the cavity of the blast furnace;
    the chamber of the tuyere and the bore of the blowpipe portion forming an internal cavity of the tuyere assembly;
    at least one injector subassembly comprising at least one outlet end;
    a nozzle positioned at said at least one outlet end, for directing said at least one fluid hydrocarbon into the internal cavity for combustion of said at least one fluid hydrocarbon to provide a flame having a preselected flame configuration;
    said at least one injector subassembly comprising an internal tube defining an internal tube bore therein and an annulus therearound, the internal tube being in fluid communication with an axial aperture in the nozzle, said at least one injector subassembly being adapted for directing a first fluid hydrocarbon through the annulus and a second fluid hydrocarbon through the tube to exit at the nozzle such that the first and second hydrocarbons are mixed together as they are directed into the internal cavity to provide the flame; and
    said at least one injector subassembly additionally comprising a plurality of injector units, each said injector unit comprising one of the outlet ends, and each said injector unit being at least partially disposed in the conduit and positioned for directing said at least one fluid hydrocarbon into the internal cavity to provide a flame having a preselected flame configuration spaced apart from said at least one wall of the tuyere, to avoid direct impingement of the flame on said at least one wall.

2. A tuyere assembly according to claim 1 in which the internal tube is defined by a longitudinal axis thereof and the annulus is coaxial with the internal tube.

3. A tuyere assembly according to claim 2 in which the outlet end is at least partially defined by an end wall.

4. A tuyere assembly according to claim 3 in which the nozzle comprises:
    an internal tube aperture in the end wall in fluid communication with the internal tube bore, for directing the second hydrocarbon into the internal cavity; and
    at least one end wall aperture in the end wall in fluid communication with the annulus, for directing the first hydrocarbon into the internal cavity.

5. A tuyere assembly according to claim 4 in which the nozzle additionally comprises a plurality of annulus apertures disposed in the lance wall proximal to the end wall in fluid communication with the annulus, for directing the first hydrocarbon into the internal cavity.

6. A tuyere assembly according to claim 5 in which the internal tube aperture is coaxial with the longitudinal axis.

7. A tuyere assembly according to claim 6 in which:
    said at least one end wall aperture is defined by an end wall aperture axis which is non-parallel to the longitudinal axis of the internal tube such that said first hydrocarbon mixes with said second hydrocarbon exiting said at least one internal tube aperture at a predetermined distance from the end wall;
    the annulus apertures comprise a first set of first annulus apertures, each said first annulus aperture being defined by a respective axis thereof orthogonal to the longitudinal axis, the first set being positioned a first predetermined distance from the end wall; and
    the annulus apertures additionally comprise a second set of second annulus apertures, each said second annulus aperture being defined by a respective axis thereof orthogonal to the longitudinal axis, the second set being positioned a second predetermined distance from the end wall.

8. A tuyere assembly according to claim 7 in which each said first annulus aperture is equally radially spaced apart from each other.

9. A tuyere assembly according to claim 8 in which each said second annulus aperture is equally radially spaced apart from each other.

10. A tuyere assembly according to claim 9 in which each said second annulus aperture is radially offset relative to each said first annulus aperture respectively.

11. A tuyere assembly according to claim 10 in which the nozzle comprises a plurality of end wall apertures which are equally radially spaced apart from each other.

12. A tuyere assembly according to claim 1 in which said outlet ends are equally radially spaced apart from each other.

13. A tuyere assembly according to claim 1 in which at least one said outlet ends additionally comprises a collar for directing said at least one hydrocarbon into the internal cavity such that direct contact of the flame with said at least one wall of the chamber is minimized.

* * * * *